Dec. 19, 1922.
O. STALMANN.
CONDENSING APPARATUS,
ORIGINAL FILED MAR. 27, 1918.

Inventor,
Otto Stalmann.

By Robert H. McNeill
Attorney

Dec. 19, 1922.
O. STALMANN.
CONDENSING APPARATUS.
ORIGINAL FILED MAR. 27, 1918.
1,439,274
3 SHEETS-SHEET 3
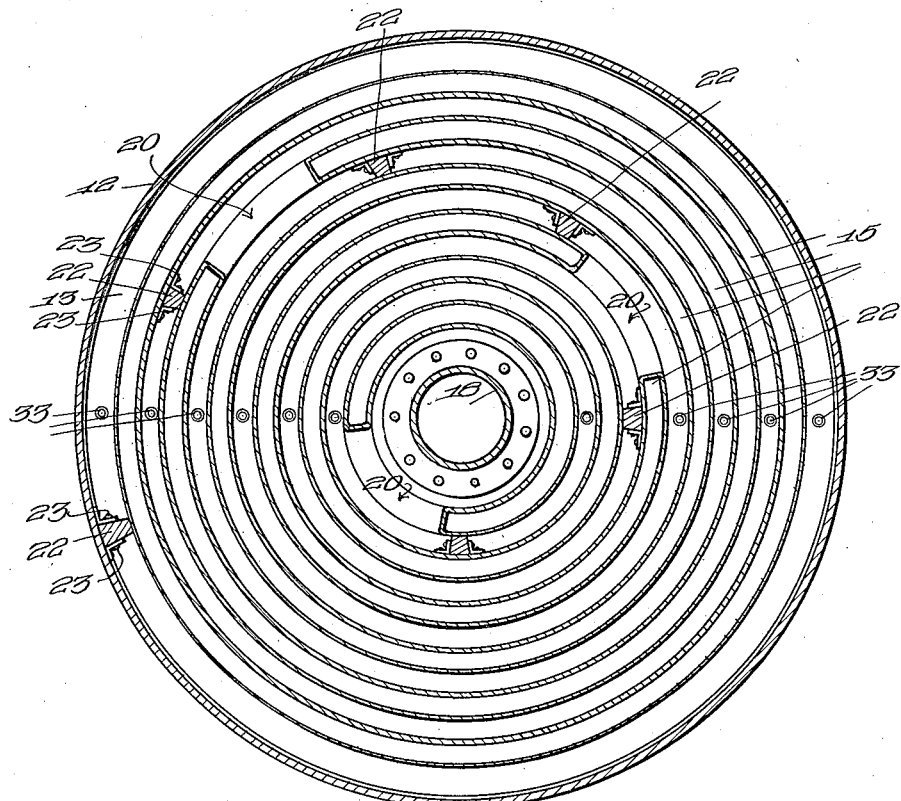
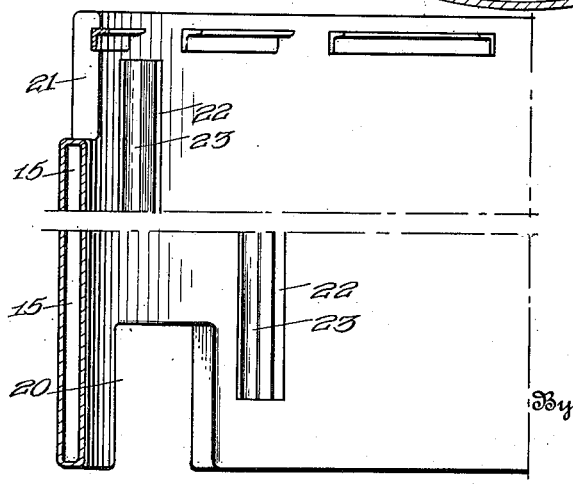
Inventor
Otto Stalmann
By
Attorney Patented Dec. 19, 1922.

1,439,274

UNITED STATES PATENT OFFICE.

OTTO STALMANN, OF SALT LAKE CITY, UTAH.

CONDENSING APPARATUS.

Application filed March 27, 1918, Serial No. 225,058. Renewed January 26, 1920. Serial No. 354,244.

*To all whom it may concern:*

Be it known that I, OTTO STALMANN, a citizen of the United States, residing at Salt Lake City, in the State of Utah, have invented certain new and useful Improvements in Condensing Apparatus, of which the following is a specification.

The present invention relates to means for condensing the vapors obtained in the distillation of oil shales or crude oils, though it is by no means limited to such use.

The primary object is to provide condensing apparatus of a novel and simple character, that is highly effective in operation, the condensation not only being effected by subjecting the hot vapors to the indirect effect of a cooling medium, such as air or water for instance, as is usually employed for this purpose, rendering the maintenance of a uniform temperature of the cooling medium and the vapors most difficult and resulting in an imperfect or unsatisfactory condensation, but expediting and facilitating the condensation of the vapors and rendering it most effective by providing large cooled contact surfaces.

In ordinary practice such vapors are condensed by passing the same through a long and expensive series of pipes exposed to the atmosphere whose temperature is depended upon to cool and consequently condense the vapors. The quality and uniformity of the condensed product, the distillate, depending on a uniformly maintained temperature, it is evident that on account of the constantly changing temperature of the atmosphere it is impossible to maintain the uniform temperature required for the production of distillates of good and uniform quality.

It is a well known fact that the speed of the condensation is not only dependent on the degree of temperature but on contact of the vapors with a cooling surface. In a steady flow of the vapors through the series of pipes as ordinarily employed the circumferential part of the vapor columns only will be in contact with the cooling surface of the pipes, a thorough mixing of the vapors during their passage through the pipes to bring each portion of the vapors in contact with the cooling surface of the pipes being incidental and partial if it takes place at all.

Again it is a well known fact that forceful impinging of the vapors against the cooling surfaces facilitates and expedites the process of condensation to a considerable degree. In the condensation plants as now ordinarily employed neither the thorough mixing of the vapors nor the great advantage obtained by forceful friction and impinging of the vapors against the cooling surfaces has been made use of.

The condensing apparatus as conceived in this invention applies in an effective, simple and economical manner the three cardinal principles of effective hydrocarbon vapor condensation, i. e., 1. The maintenance of each respective portion of the cooling surfaces at a uniform temperature.

2. Thorough mixing of the vapor.

3. Forceful friction caused by the impinging of the vapors to be condensed against the cooling surfaces.

In the accompanying drawings:—

Figure 4 is a horizontal sectional view on the line 4—4 of Figure 1,

Figures 5 and 6 are detail sectional views illustrating the structure of a portion of one of the hollow tubular walls.

Similar reference numerals designate corresponding parts in all the figures of the drawings.

Figure 1:
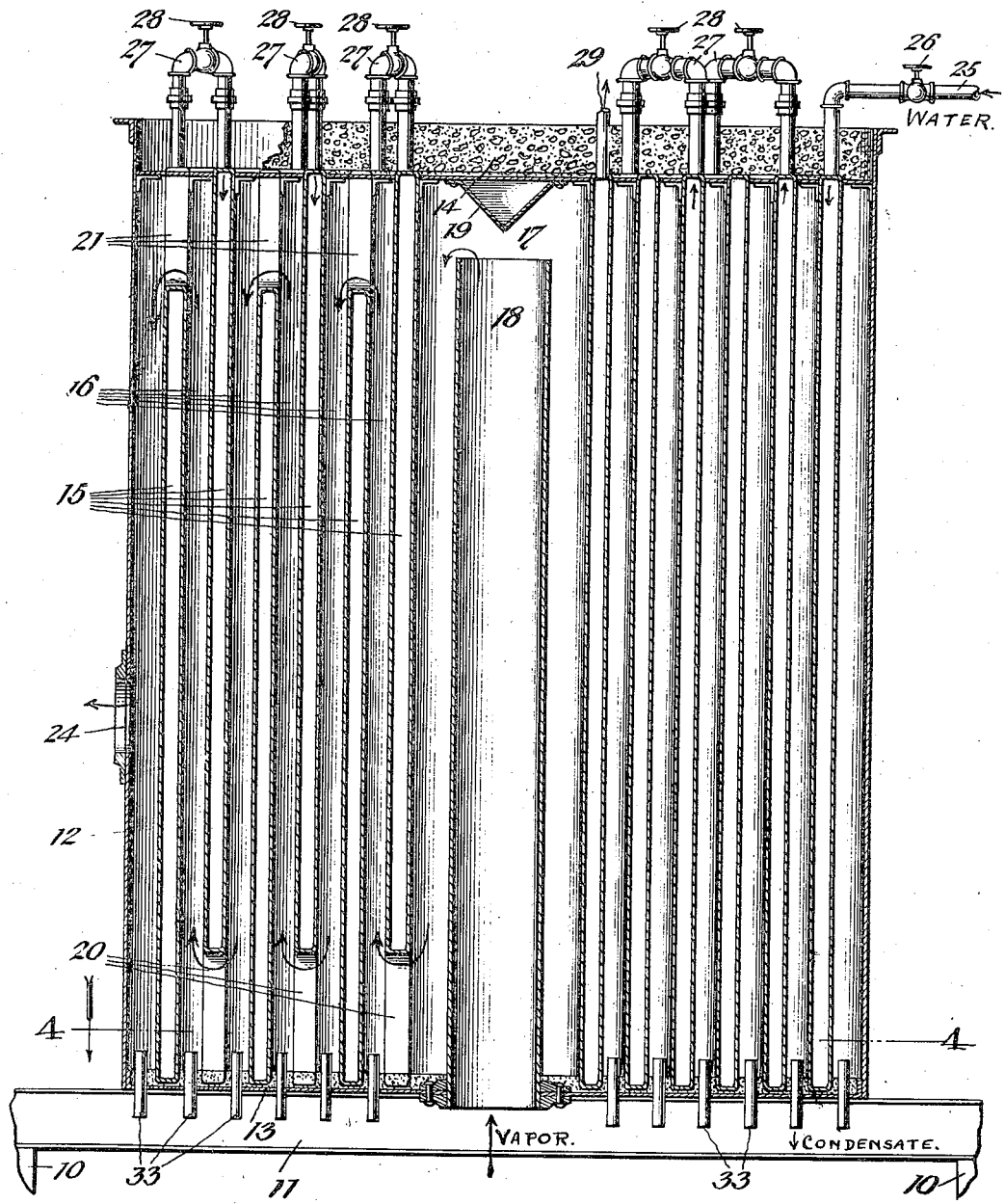
Figure 1 is a vertical sectional view through the condenser.

In the embodiment disclosed, a suitable support is employed, comprising spaced walls 10, on which are mounted girders 11 carrying the condenser.

This condenser includes an outer casing 12 preferably in the form of an upright cylinder having a bottom 13, and a top 14, the latter being shown as concrete, though any desired material may be employed. Within this casing are located a series of tubular walls 15 preferably cylindrical in form, arranged in upright relation, one within the other and spaced apart, thus producing condensing chambers 16. The walls are of hollow formation for the circulation therein of a cooling medium, as hereinafter explained. The innermost wall provides a central chamber 17, into which extends from the bottom an upright supply conduit 18 that terminates short of the top 14, and has its lower end connected by any suitable means with a still or other vapor producing mechanism, not shown.

Figure 2:
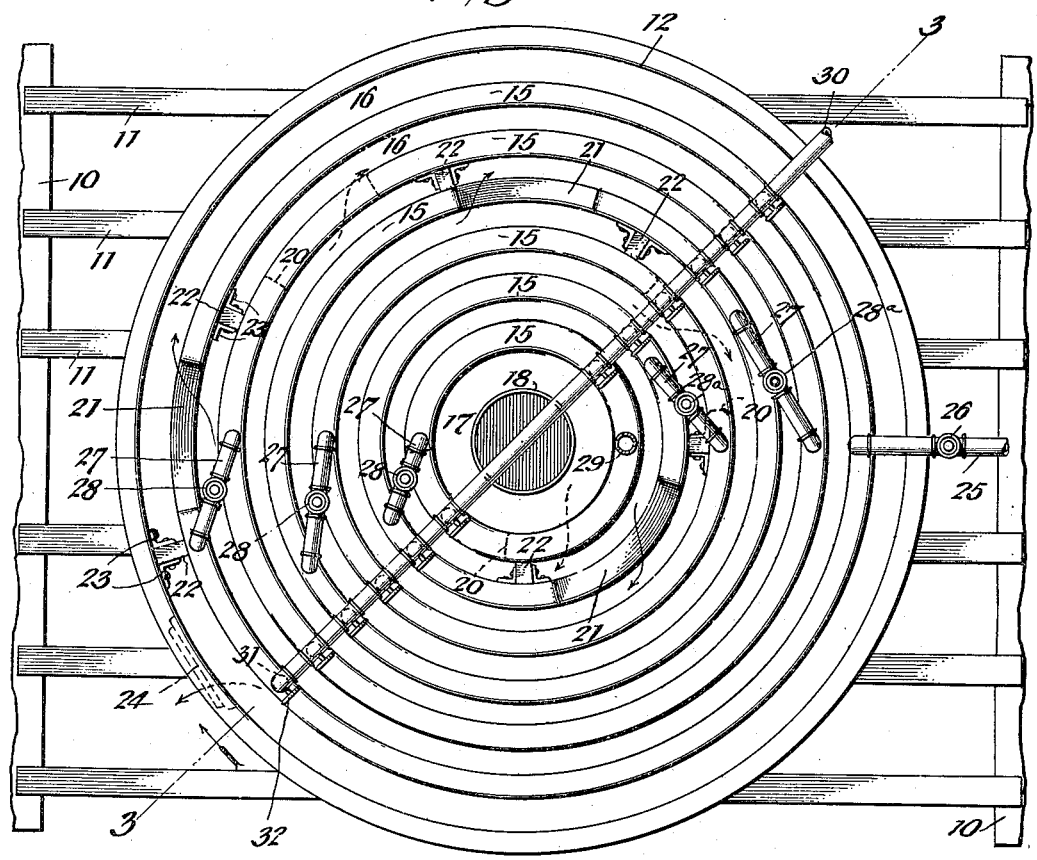
Figure 2 is a top plan view with the cover removed.
Figure 3:
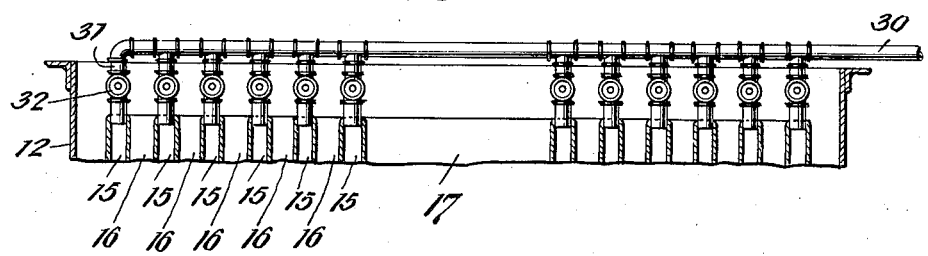
Figure 3 is a detail sectional view on the line 3—3 of Figure 2.

The upper end of the conduit 18 is open, and located above it is a deflecting cone 19 suspended from the top 14. A port 20 is formed in the lower end of the innermost wall 15, and thus affords communication between the central chamber 17 and the chamber 16 immediately surrounding it. This chamber in turn has communication with the next chamber outside the same through a port 21 formed in the upper end of the next wall 15 that is interposed between the two chambers. It will be understood that Figure 1 is diagrammatic in its character, in order to illustrate the alternate upper and lower ports, and it will be observed by reference to Figure 2 that the lower and upper ports 20 and 21 are disposed out of vertical alignment. Between these ports, and thus cutting off direct communication from one to the other is a vertical baffle partition 22, which may be a suitable strip of wood held between angle irons 23 secured to one of the walls. Consequently the vapor entering the upper end of the central chamber 17 must pass downwardly, and thence through the port 20 into the surrounding chamber 16. Because of the baffle partition 22, before it can pass out through the port 21, it must pass around the innermost wall 15, and thence to the upper part of the condenser. The other walls are similarly provided with ports 20 and 21 respectively separated by corresponding partitions 22, so that, as indicated in Fig. 2 the vapors must have an alternate up and down movement and in a generally outward tortuous direction, their final escape being through a port 24 formed in the casing 12.

For the purpose of supplying a cooling medium to the walls 15, a pipe 25 is connected to the outermost wall and is controlled by a suitable valve 26. This outermost wall is in turn connected to the next inner wall at a point diametrically opposite to the pipe 25, by a pipe 27 in which is also located a controlling valve 28ª. The other walls are, in turn, alternately connected on diametrically opposite sides by similar pipes 27 having valves 28 therein, and consequently it will be clear that water or other suitable fluid will be caused to circulate through the various walls, the final outlet for the cooling medium being from the innermost wall 15 through a pipe 29. In addition, a supplemental supply pipe 30 may be provided having branches 31 communicating with the different walls, the branches being controlled by valves 32. Outlet means are provided for the liquids of condensation, these outlets being shown at 33 and leading to any suitable reservoirs or cooling means. It will be understood that any number may be employed and that they may be arranged as desired. Their upper ends preferably extend slightly above the bottom of the condenser.

In the structure disclosed the arrangement is such that the vapors are introduced to the center of the condenser and are compelled to follow a circuitous route to the exterior. On the other hand the cooling water or other medium is supplied first to the outermost wall and is caused to have a circuitous path toward the center. It will thus be clear that the vapor in its hottest condition is first brought into contact with walls that are but slightly cooled, and as the vapors become cooler during their passage they are in turn brought into contact with walls that are more and more cooled. A highly beneficial condensing effect is thus secured, and it will be evident that the temperature of the cooling medium can be varied as desired according to the amount and character of the vapor supplied by regulating the water supply valve 26 or by introducing cold water to any one of the walls through the supplemental pipe 30 and its branches 31. It will, of course, be understood that the paths of travel of the vapors and the cooling medium can be reversed if desired without in any manner altering the structure.

It is also a well known fact that the vapors of high specific gravity or high boiling point furnish a distillate of better quality and uniformity when subjected to a higher temperature of the cooling medium for condensation than those of a lower specific gravity or boiling point and those of a lower specific gravity or boiling point furnish distillates of better quality when brought in contact with the cooling medium at a lower temperature.

This invention provides for these conditions by the fact that the vapors travel through the condensing apparatus in a spiral circular flow from the center towards the periphery of the apparatus, while the cooling medium, water for instance, travels in the opposite direction from the periphery of the apparatus towards its center.

As the hot vapors, traveling in their circuitous route from the center of the condensing apparatus towards its periphery, proceed, they have near the center of the apparatus the greatest velocity and come into contact with the cooling medium of a comparatively high temperature on their progress decreasing their speed gradually in contact with a gradually decreasing temperature of the cooling medium, until the last remaining light hydrocarbons of low specific gravity and low boiling point, passing through the last circular condensing compartment, remain a comparatively long time in contact with the coolest portion of the cooling medium near the periphery of the condensing apparatus, where the lightest hydrocarbon vapors are condensed until finally the permanent gases escape at the end of the last and longest condensing compartment to be received in a gas receiver, where they accumulate and are drawn off for use as fuel required for the distillation or for other industrial purposes. The vapors, therefore, traveling from the center towards the periphery of the condensing apparatus decrease in velocity as well as temperature in the same degree as the cooling medium traveling in the opposite direction from the periphery towards the center of the apparatus increases in speed and temperature. In this manner a previously determined speed and temperature of vapors as well as of cooling medium can easily be maintained and the various distillates in the different compartments may be constantly produced under the same conditions, resulting in the continuous production of distillates of the same quality and uniformity.

The forceful friction and impinging of the vapors against the cooling medium, is brought about in this invention by providing circular cooling surfaces, producing by the centrifugal force emanating from the passage of the vapors along the circular cooling surface the mixing of the vapors and the forceful friction and impinging against the cooling surfaces as described.

From the foregoing, it is thought that the constructon, operation and many advantages of the herein described invention will be apparent to those skilled in the art without further description, and it will be understood that various changes in the size, shape, proportion and minor details of construction, may be resorted to without departing from the spirit or sacrificing any of the advantages of the invention.

Having thus fully described my invention, what I claim as new, and desire to secure by Letters Patent, is:—

1. In apparatus of the character set forth, the combination with a plurality of tubular walls of hollow formation arranged one within the other and spaced apart to form a corresponding plurality of annular chambers between them, means for causing a circuitous circulation of a cooling medium in each of the various walls, and means for causing a circulation of vapors to be condensed, in a generally spiral direction in each chamber and successively through the various chambers.

2. In apparatus of the character set forth, the combination with a plurality of tubular walls of hollow formation arranged one within the other and forming between them condensing chambers, of means for causing alternate upward and downward circulation of vapors to be condensed in adjacent chambers and simultaneously causing said vapors to move in a generally spiral circuitous direction in each of the chambers, and means for causing a circulation of cooling medium within the walls.

3. In apparatus of the character set forth, the combination with a plurality of tubular walls arranged one within the other and forming between them chambers, said walls having ports affording communication between adjacent chambers, and baffle partitions across certain of the chambers and located between the ports thereof.

4. In apparatus of the character set forth, the combination with a plurality of tubular walls arranged one within the other and forming between them chambers, upper and lower ports respectively in the opposite walls of each of certain of the chambers affording communication with the adjacent chambers within and without the same respectively, and baffle partitions in the said chambers interposed between the said ports that open into said chambers.

5. In apparatus of the character set forth, the combination with a support, of a plurality of upright substantially cylindrical walls of hollow formation mounted on the support one within the other and spaced apart to produce a plurality of condensing chambers, a conduit connected to the outermost chamber, a conduit communicating with the innermost chamber, each of said walls having a transversely disposed port affording communication between the different adjacent chambers, upright baffle partitions located in each of the chambers between the upper and lower ports that open thereinto, means for supplying liquid to the different chambers, and means for controlling such supply.

6. In apparatus of the character set forth, the combination with a support, of a plurality of upright substantially cylindrical walls of hollow formation mounted on the support, one within the other in substantially concentric relation and spaced apart, forming a plurality of substantially annular condensing chambers between them, each wall having a port affording communication between adjacent chambers, longitudinal baffle walls extending across the chambers between the ports to cause a transverse circuitous circulation of vapors through each chamber and through a port to the next, and means for causing the circulation of a cooling medium through each of the walls and from one to another.

In testimony whereof I affix my signature.

OTTO STALMANN.